Nov. 22, 1960  J. R. URSCHEL ET AL  2,961,024
CHAMBER FOR CENTRIFUGAL SLICING MACHINE
Filed Feb. 13, 1958  5 Sheets-Sheet 1
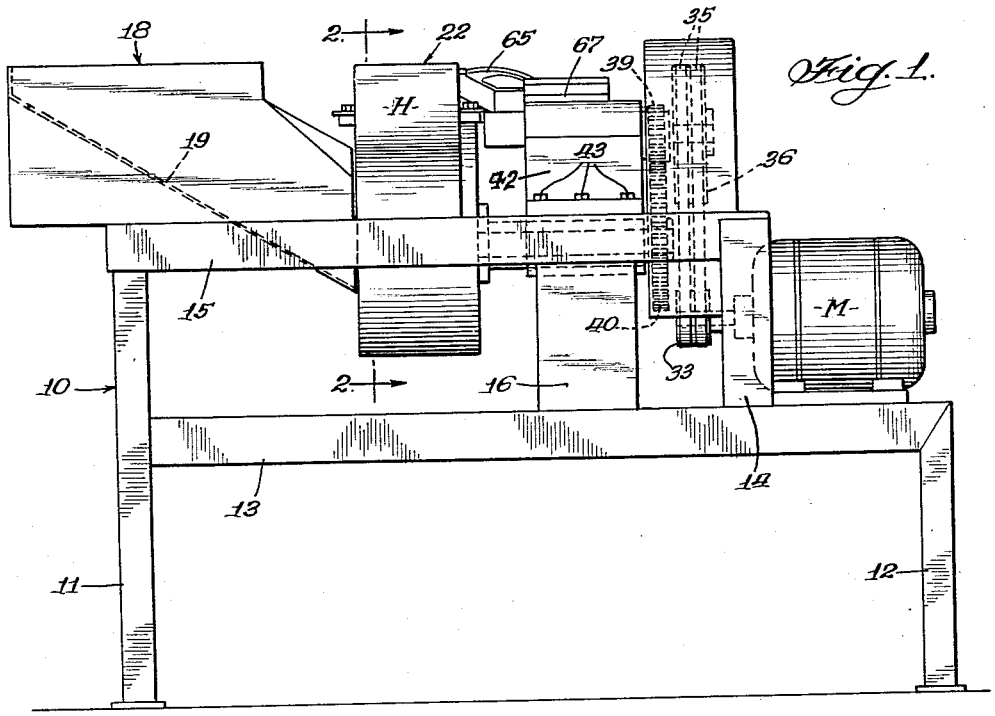
Fig. 1.
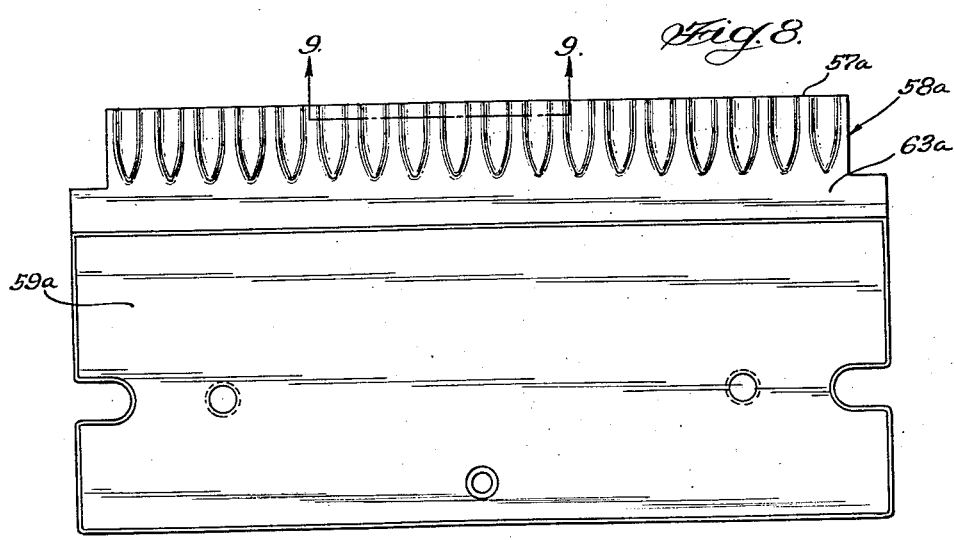
Fig. 8.
Fig. 9.
INVENTORS.
Joe R. Urschel
Gerald W. Urschel
Atty.

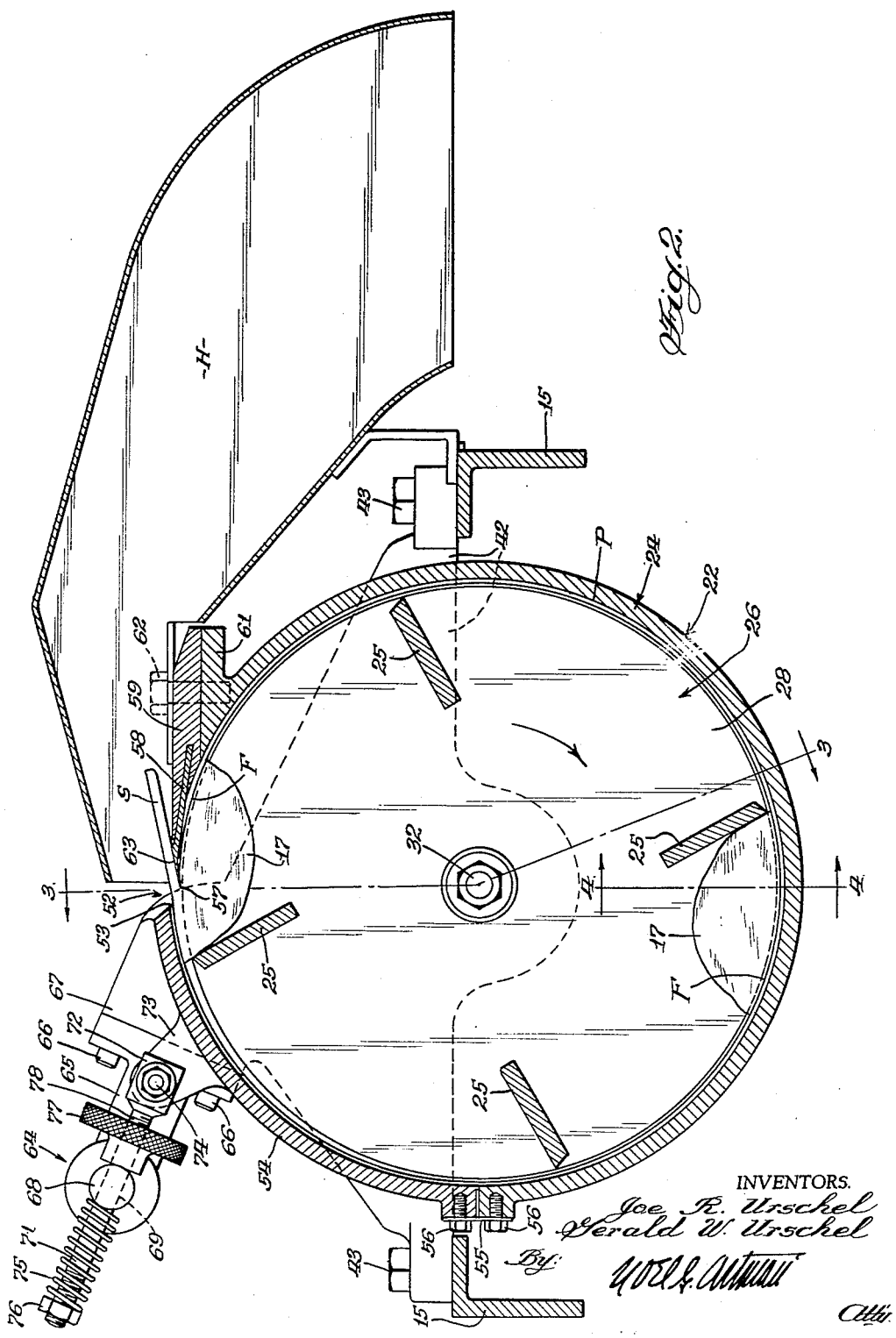

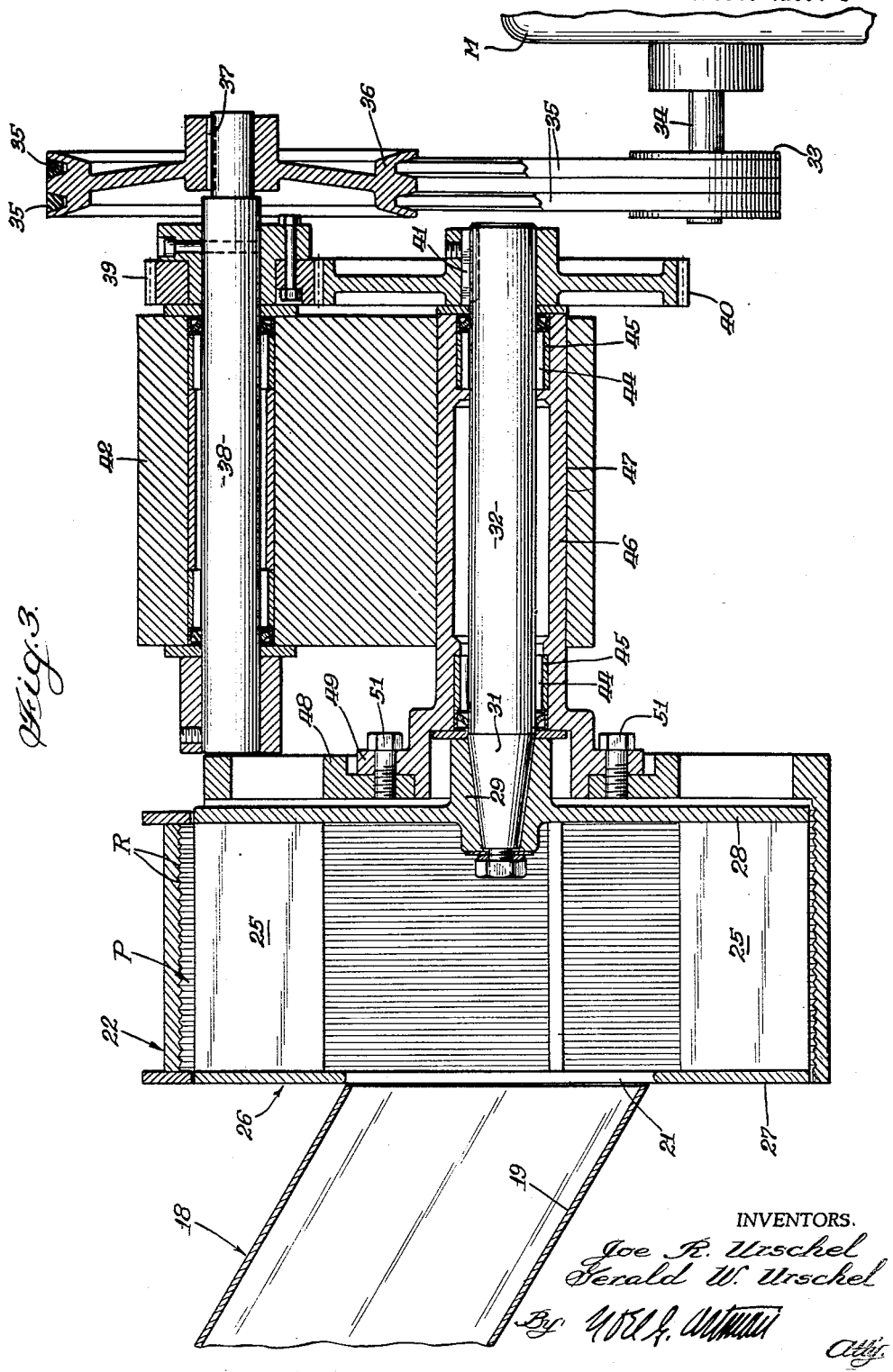

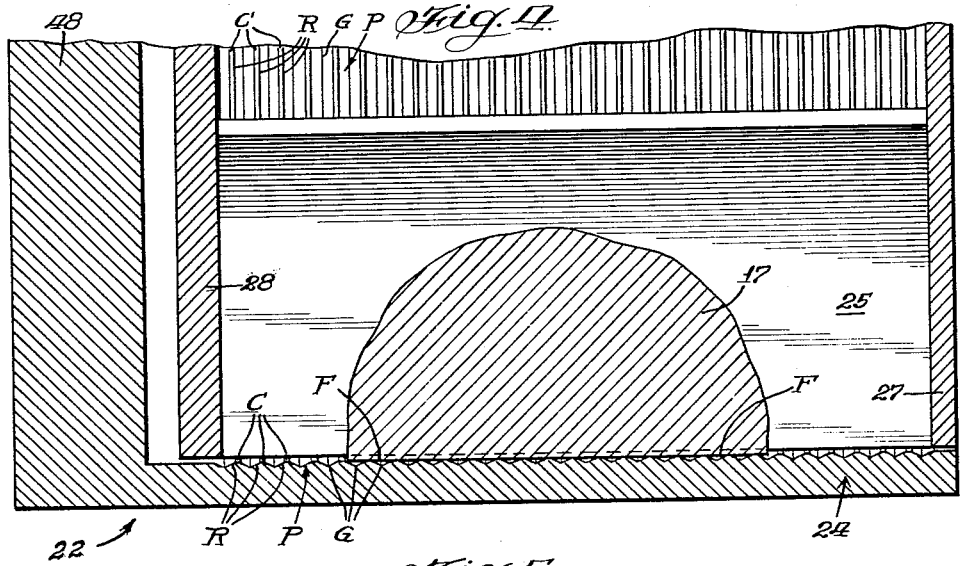
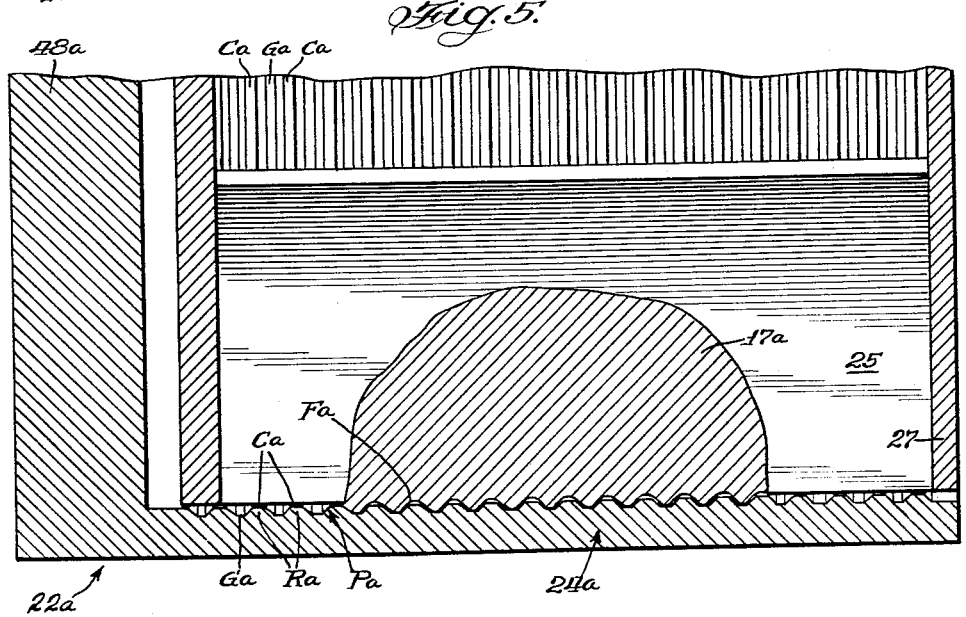
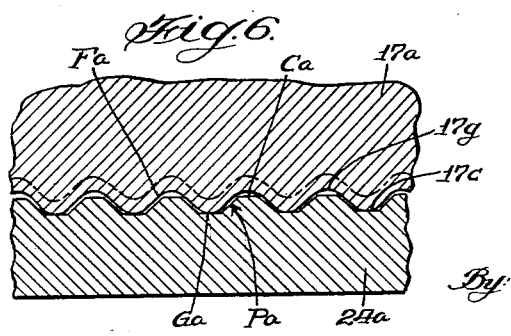
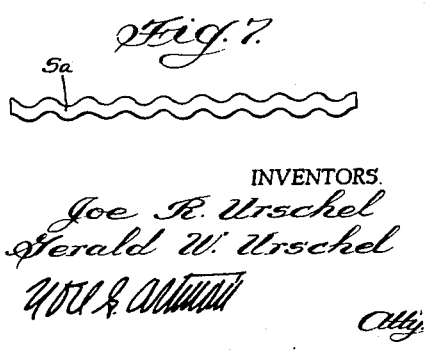

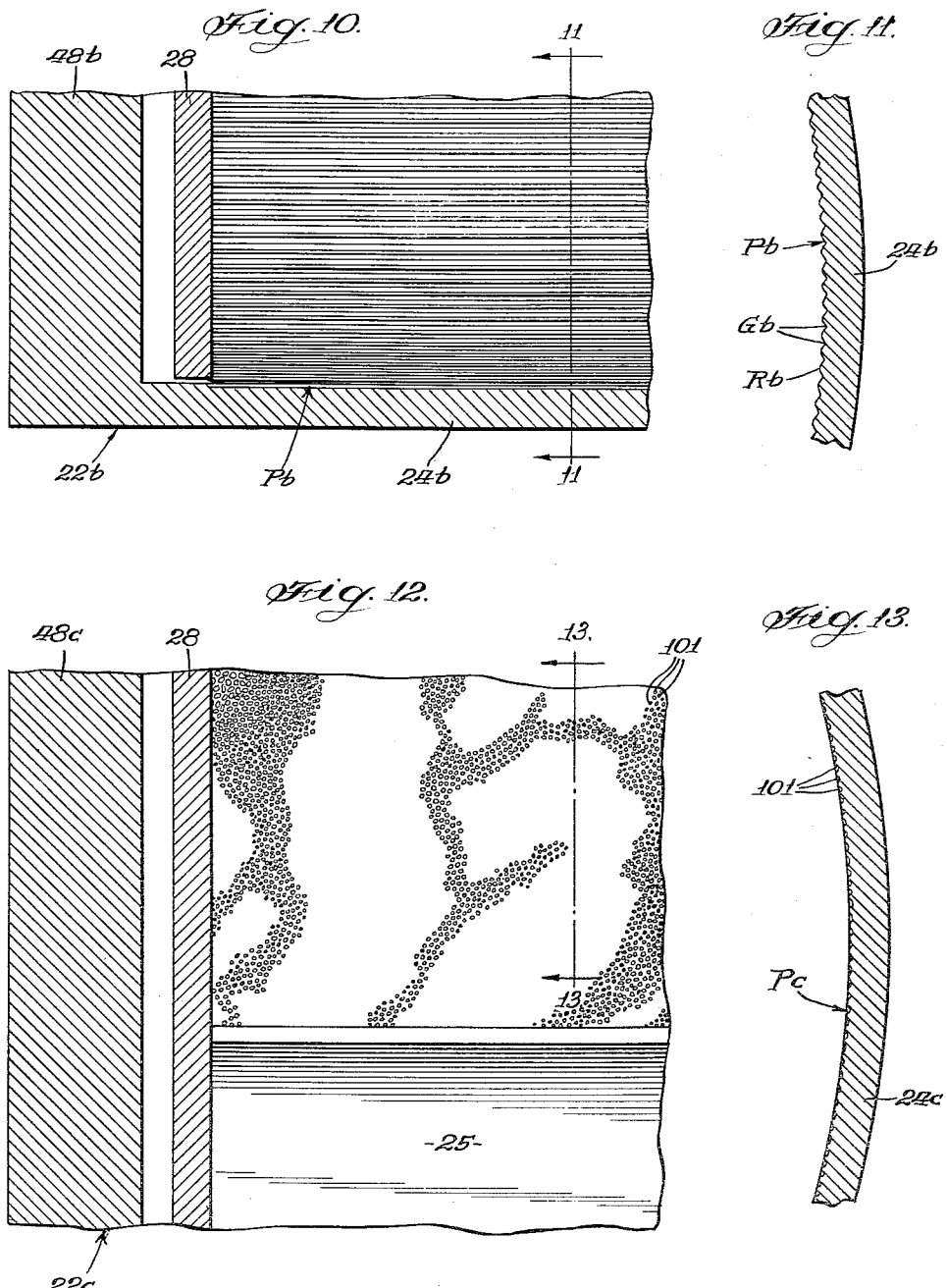

United States Patent Office 2,961,024
Patented Nov. 22, 1960

2,961,024
CHAMBER FOR CENTRIFUGAL SLICING MACHINE
Joe R. Urschel and Gerald W. Urschel, both of 158 S. Napoleon St., Valparaiso, Ind.
Filed Feb. 13, 1958, Ser. No. 715,096
4 Claims. (Cl. 146—164)

This invention relates to machines for cutting juice-laden articles such as potatoes into slices pursuant to such articles being propelled about a chamber wall into periodic engagement with a slice-removing knife which attendant to cutting away the slices also cuts faces on the articles that slide upon a periphery of such wall en route to succeeding engagement with the knife, and more particularly concerns the relief of such wall periphery causing it to engage only portions of the article face to diminish adhesion thereof with such periphery.

Numerous juice-laden fruit and vegetable articles when presenting an entire freshly cut smooth face thereof against a conforming smooth supporting surface is so tenaciously sealed and bound to the supporting surface by the natural juice that considerable force is required to slide the article upon such surface. The force required to slide the articles is increased when the articles are centrifugally pressed against the supporting surface as is the case when they are being processed in a slicing machine of the character mentioned above. It has been found, however, that by roughening the faces of the articles or the guide surface upon which the faces are slid that the magnitude of this force necessary to slidingly propel the articles is materially diminished. Roughening the guide surface of a slicing machine has diminished the amount of this force to as little as one-eighth of that required with a smooth surface.

While diminishing the force required to slide the articles on the chamber wall gains the advantage of diminishing the power required to operate the slicing machine, there is the less obvious though important further advantage that the diminished propelling force avoids much skewing or turning of the articles about axes normal to the surface upon which they are sliding, wherefore the articles so remain in the same position of orientation during successive encounters with the slicing knife which results in slices of uniform thickness. This is extremely important when making thin slices for potato chips.

An important object of this invention is the provision in a slicing machine wherein sliceable articles are orbitally propelled in sliding centrifugally-pressed relation with the periphery of a supporting wall therefor cyclically into encounter with a slicing knife which cuts slices from the encountering articles and forms faces thereon for sliding contact with the wall periphery during continued propulsion of the orbited articles, of a contour of such periphery non-smoothly conforming to the entire faces cut by the slicing knife wherefor a portion or portions of these faces will avoid pressure contact with such periphery.

A more specific object is the provision of an intersticed contour of said wall periphery in the sense of it having crevices, grooves, depressions, cavities or the like of size and number to roughen such periphery and thus relieve portions of an article face sliding thereon from making contact therewith.

A further object is the provision of such a wall periphery having article-face engaging ribs extending in the direction the articles are propelled and which are engageable with spaced-apart portions of substantially flatly formed article faces. Very slight impression of these ribs into the article faces resists skewing of the articles out of orientation with the slicing knife. These ribs are preferably smooth to assuredly avoid scuffing or bruising the article faces.

Still a further object is the provision of a slicing machine in which the cutting edge of the slicing knife is undulated to cut wavy "krinkle cut" slices attendant to cutting parallel ribs interspersed with grooves on the faces of the articles, and a wall periphery with ribs extending in the direction the articles are propelled and meshable with the article face ribs. In this case the ribs of the periphery are of different amplitude or otherwise differently shaped than those cut in the face of the articles so less than the entire face of the articles will contact the periphery. The meshed ribs are very effective to prevent the orbited articles skewing or shifting out of orientation and exact registry with the slicing knife.

These and other desirable objects inherent in and encompassed by the invention are elucidated in the ensuing specification, the appended claims and the annexed drawings, wherein:

Fig. 1 is a side elevational view of a slicing machine embodying a slicing chamber constructed in accordance with the present invention.

Fig. 2 is an enlarged sectional view taken through the slicing chamber of the machine as indicated at the line 2—2 in Fig. 1.

Fig. 3 is an enlarged fragmentary view principally sectional coinciding with the axis of the slicing chamber and at the line 3—3 in Fig. 2.

Fig. 4 is an enlarged fragmentary sectional view taken on the line 4—4 of Fig. 2 illustrating one species of interstice means in the form of ribs circumscribing the inner periphery of the slicing chamber.

Fig. 5 is a view similar to Fig. 4, illustrating a different species of rib formation upon the inner periphery of the chamber together with a ribbed face cut upon the article being sliced by a knife of the species illustrated in Figs. 8 and 9.

Fig. 6 is a fragmentary enlargement of a portion of Fig. 5 showing greater detail of the ribs upon the inner periphery of the slicing chamber, together with a dot-dash line illustrating the position the slicing knife edge will next pass through the article and the disposition of such edge with respect to the ribs of the chamber periphery.

Fig. 7 is an edge view of a slice cut from the sliceable article by the chamber illustrated in Figs. 5 and 6 and the knife illustrated in Figs. 8 and 9.

Fig. 8 is a plan view of one species of slicing knife.

Fig. 9 is a fragmentary sectional view taken on the line 9—9 of Fig. 8.

Fig. 10 is an enlarged fragmentary view taken similarly to Figs. 4 and 5, illustrating another species of ribs which may be used for roughening the inner periphery of the slicing chamber.

Fig. 11 is a fragmentary sectional view taken on the line 11—11 of Fig. 10.

Fig. 12 is an enlarged fragmentary view taken similarly to Figs. 4 and 5, illustrating still another species of roughening means on the inner periphery of the slicing chamber.

Fig. 13 is a fragmentary sectional view taken on the line 13—13 of Fig. 12.

The slicing machine herein shown comprises a bench frame 10 having two longer legs 11 at one end and two shorter legs 12 at the opposite end. Only two of the legs 11 and 12 are shown in Fig. 1 where these visible legs conceal the corresponding legs respectively therebehind. Each pair of legs 11 and 12 is joined by a lower side-rail 13. A frame upright 14 is mounted upon each side rail 13, and an upper side-rail 15 joins the upper end of each leg 11 with a respective one of the uprights 14. Additional upright frame members 16 are mounted on the rails 13 and connect with the side-rails 15 respectively above the side-rail 13. Cross members, not shown, of any desired number connect the frame members 11, 12, 13 and 15 with the corresponding concealed frame members at the back side of the frame.

Sliceable articles 17 such as whole peeled potatoes are introduced into a hopper 18 having a bottom wall 19 declining as a chute, Figs. 1 and 3, to deliver the articles through an end wall opening 21 coaxially into a cylindrical slicing chamber 22 where these articles are centrifugally orbited in sliding contact with the inner periphery P of the chamber wall 24, by means of circumferentially spaced paddles 25 of a rotor 26. An annular front plate 27 of the rotor 26 forms the front wall of the chamber 22 and contains said chamber opening 21. Rotor paddles 25 interconnect the front plate 27 of the rotor 26 with a rear plate 28 of disc form having a hub 29 fixed on a tapered end portion 31 of a rotor drive shaft 32.

Power for driving the shaft 32 and the rotor 26 is obtained from an electric motor M mounted on the frame 10 as illustrated in Fig. 1 and shown fragmentarily in Fig. 3. A double-grooved pulley 33 on the armature shaft 34 of the motor M drives belts 35 for rotating a pulley 36 keyed at 37 to a shaft 38. Shaft 38 rotates a gear 39 constrained for rotation therewith and this gear meshes with and drives a gear 40 keyed to the shaft 32 at 41.

Shafts 32 and 38 are journalled in a bearing block 42 which as shown in Figs. 1 and 2 extends between and is mounted upon the bench frame side rails 15. Cap screws 43 secure the bearing block 42 to the side rails 15. Shaft 32 is indirectly journaled in the bearing block 42 in the sense that sets of roller bearings 44 for this shaft have their outer races 45 disposed within a tubular stem 46 which is disposed nonrotatively in a bore 47 in the bearing block. This tubular stem 46 is a mounting means for the slicing chamber 22 and is an extension of the end wall 48 of this slicing chamber to which a flange 49 of the tubular stem is secured by cap screws 51.

In Fig. 2 it can be seen the slicing chamber 22 has a slice discharge opening 52 in the upper side of its cylindrical wall 24. An approach edge 53 of this opening 52 is formed upon a hinged portion 54 of the wall 24. A flexible hinge plate 55 together with cap screws 56 connect the wall portion 54 to the main part of the wall 24. This arrangement enables the wall portion 54 to be adjusted for selectively altering the position of the approach edge 53 radially of the chamber and with respect to an opposite slicing-knife edge 57 of the opening 52. Knife edge 57 is straight and extends axially of the chamber 22 the full length of the wall 24. This knife edge is formed upon a knife 58 which forms part of the chamber wall 24 as does the holder 59 for this knife. The knife holder is secured onto a mounting pad 61 of the wall 24 by cap screws 62 which also secure a slice deflecting hood H upon the slicing chamber. It can be seen in Fig. 2 the slicing knife edge 57 is offset somewhat inwardly of the chamber with respect to the approach edge 53 and is coincident with the inner periphery P of the wall 24 to adapt the knife to penetrate and cut away a slice S from an orbitted article 17. A face 63 of the knife deflects such slices upwardly and outwardly through the opening 52 into the deflector hood each time an article encounters and passes the knife. The knife edge 57 is further operable attendant to cutting away each slice S to also form a face F on the article to slidingly engage the wall periphery P during ensuing orbital movement of the article en route to a succeeding encounter with the knife.

Slice thickness is determined by a device 64 which controls the pivoted position of the wall portion 54 about the hinged connection 55. This in turn controls the amount of offset of the approach edge 53 with respect to the knife edge 57, the farther offset outwardly the edge 53 is with respect to the opposed cutting edge 57 greater will be the thickness of the slice S. Slice thickness control device 64 comprises a bracket 65 held by cap screws 66 upon a mounting pad 67 formed on the bearing block 42; note Figs. 1 and 2. Bracket 65 carries a cylindrical pin 68 of which an end is visible in Fig. 2. A diametric bore 69 through the pin 68 slidedly contains a rod 71 having a head 72 on its lower end. This head 72 is pivotally connected with an apertured ear 73 on the wall portion 54 by a pin 74. A spring 75 surrounding the rod 71 and reacting expansively between the pin 68 and a nut 76 on the rod 71 urges such rod upwardly and leftward as viewed in Fig. 2 a variable distance selectable by a finger-operated nut 77 abutting with the pin 68. This finger nut is adjustable axially on the rod 71 by rotation upon a threaded portion 78 of the rod.

Interstice means on the inner periphery P of the chamber wall 24 to diminish the area of contact of the article face F with the wall periphery takes the form of ribs R which extend completely circumferentially about such periphery excepting for a very short distance upon the knife 58 adjacently to knife edge 57. Greater detail of these ribs in transverse profile is illustrated in Fig. 4. Crests C of these ribs are transversely flat and provide the entire area for contact with the article faces F while holding these faces out of contact with the surface of grooves G interspersed with the ribs R. These flattened crests C may be regarded as lands upon which the faces F of the article 17 slide. In the sense that these lands slightly press into the article surfaces F, and thereby prevent the articles skewing about axes perpendicular to the periphry P, such lands or crests C serve as guide tracks for the articles. The amount of this pressing of the lands C into the article faces F should be limited to avoid mutilating the faces and at the same time to hold a sufficient portion of the faces out of contact with the periphery P so that the adhesion between such faces and the periphery is materially diminished over what it would be if the entire face were permitted to come into contact with such periphery. It has been found a satisfactory periphery P is formed when the lands C have a width approximately within the range of .040 to .050 inch. The groove width relatively to the land width is preferably such that 10 percent to 50 percent of the periphery P is constituted by the surface area of the lands.

Fig. 5 shows a chamber 22a corresponding to the chamber 22 but wherein the cylindrical periphery Pa of the wall 24a contains grooves Ga between the ribs Ra that are transversely flattened to be engaged by the crests 17c of a ribbed or undulated face Fa of a sliceable article 17a. The face Fa was cut by a knife 58a illustrated in Figs. 8 and 9. This knife 58a and its holder 59a are generally shaped like the knife 58 and the holder 59 so as to be associated with and mounted as a part of the chamber wall 24a in the manner the knife 58 and the holder 59 are associated with the chamber wall 24. It can be seen in Figs. 8 and 9 the edge 57a of the knife 58a is undulated. This causes the knife edge 57a to cut the face Fa of the article 17a, Figs. 5 and 6, with the crests 17c interspersed with grooves 17g. The amplitude of the undulations of the knife edge 57a slightly exceed that of the crests Ca and grooves Ga of the chamber wall 24a, although the width of these grooves and crests of the wall 24a is equal to that of the crests and grooves in the article 17a so the ribs upon which the crests 17c are formed mesh with the ribs upon which the crests Ca are formed. The article crests 17c therefore ride upon the transversely flattened grooves Ga of the chamber wall and hold the remainder of the face Fa out of contact with the wall periphery Pa.

Slices formed by the knife 58a take the form of the slice Sa illustrated in Fig. 7 which is an edge view of such a slice looking in a direction parallel to the ribs and grooves therein.

A third species of slicer chamber wall is shown in Figs. 10 and 11. The fragmentarily shown chamber 22b in Fig. 10 has an end wall 48B corresponding to the wall 48 of the first described species and also a cylindrical wall 24b also corresponding to the cylindrical wall of the first species. A fragment of the rotor end plate 28 is shown associated with the chamber 22b. The interstice means on the inner periphery Pb of this chamber wall takes the form of ribs Rb and intervening grooves Gb extending axially of the wall.

A fourth species of chamber wall periphery is shown in Figs. 12 and 13. The fragmentarily shown chamber 22c in Fig. 12 corresponds to the chamber 22 of the first species, and this chamber has an end wall 48c and a cylindrical wall 24c with an inner periphery Pc. The slicing chamber 22c contains a rotor 28 and its paddles 25 of which one is shown. The interstice means on the inner periphery Pc of this chamber wall 24c is in the form of miniature depressions or pits 101. These miniature pits 101 may be formed by a process of acid etching or pitting.

Having described a limited number of species of the invention with the view of concisely illustrating the same, we claim:

1. A slicing device comprising a container, a substantial portion of which is in the form of a cylinder, and the remaining portion thereof extending eccentrically outwardly therefrom to form a gap having a cutter on the innermost edge thereof, pusher means interiorly of said cylinder in coacting relation therewith, the inner surface of said cylinder and eccentric portion being provided with inwardly extending circumferentially arranged ribs, the cutting edge of said cutter being of a shape which differs from that of a transverse portion of said cylinder and ribs, whereby when the cut material slides around said cylinder vacuum therewith will be avoided.

2. The combination set forth in claim 1, wherein the knife edge is substantially straight and thus adapted to cut a substantially planar face on the article to slidingly engage only crest portions of the ribs of the wall inner surface.

3. The combination set forth in claim 1, wherein the knife edge is also undulated to cut ribs in the face of the article that mesh with the ribs of the wall inner surface.

4. The combination set forth in claim 3, wherein the undulations of the knife edge have an amplitude exceeding the height of the wall surface ribs so as to cut higher ribs on the article face than are on the wall surface that engage the area between the ribs of the wall surface to hold portions of the face between the article face ribs out of contact with the crests of the ribs of the wall surface.

References Cited in the file of this patent
UNITED STATES PATENTS

| | | |
|---|---|---|
| 2,436,410 | Urschel et al. | Feb. 24, 1948 |
| 2,704,096 | Olsen | Mar. 15, 1955 |
| 2,832,387 | Woodward | Apr. 29, 1958 |